United States Patent
Gregory

[19]

[11] Patent Number: 6,099,117

[45] Date of Patent: Aug. 8, 2000

[54] HINGE WITH WIRE EXTENDING THERETHROUGH

[75] Inventor: Christopher C. Gregory, Newtown, Pa.

[73] Assignee: PPG Industries Ohio, Inc., Cleveland, Ohio

[21] Appl. No.: 09/211,787

[22] Filed: Dec. 15, 1998

[51] Int. Cl.[7] .................................................. G02C 7/12
[52] U.S. Cl. .............................. 351/49; 351/41; 351/153
[58] Field of Search .............................. 351/49, 41, 158, 351/153, 44; 2/432; 16/228

[56] References Cited

U.S. PATENT DOCUMENTS

| | | |
|---|---|---|
| 4,254,451 | 3/1981 | Cochran, Jr. .............................. 351/158 |
| 4,618,226 | 10/1986 | Sartor et al. .............................. 351/113 |
| 4,756,605 | 7/1988 | Okada et al. .............................. 350/347 V |
| 4,978,209 | 12/1990 | Ohba ........................................ 351/153 |
| 4,991,951 | 2/1991 | Mizuno et al. .............................. 351/41 |
| 5,520,851 | 5/1996 | Yu et al. ................................... 252/518 |
| 5,654,786 | 8/1997 | Bylander ................................... 351/49 |
| 5,835,185 | 11/1998 | Kallman et al. ........................... 351/158 |

*Primary Examiner*—Hung Xuan Dang
*Attorney, Agent, or Firm*—William C. Mitchell

[57] ABSTRACT

Hinge and one or more wires, or electrical conductors, wherein portion of such wire or wires extends axially through the hollow pivot pin of a hinge and wherein such portion of the wire or wires is placed in torsion upon the hinge being pivoted.

18 Claims, 4 Drawing Sheets

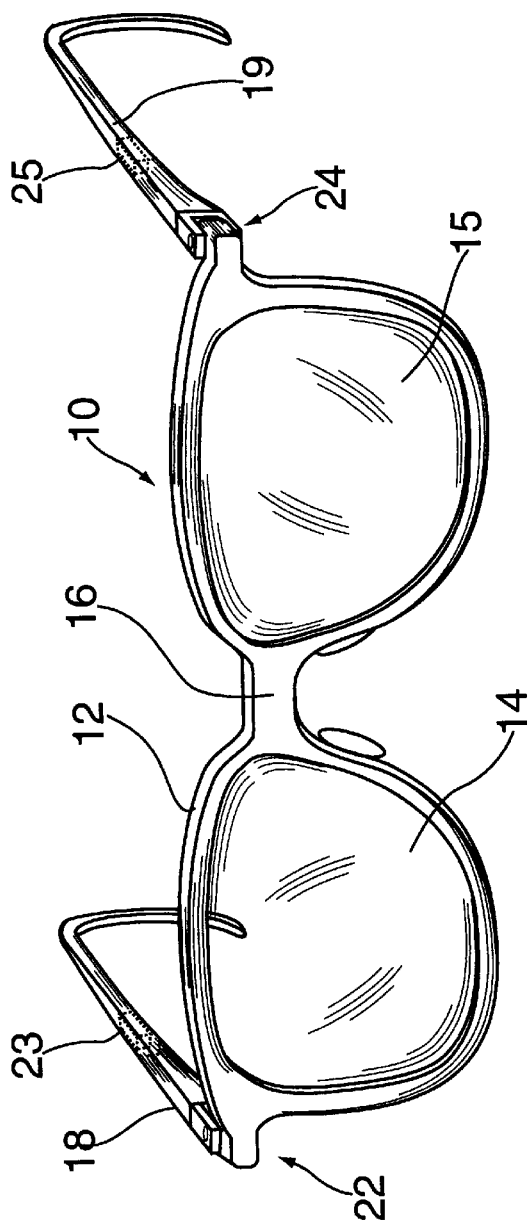
FIG. 1
FIG. 5
FIG. 4

HINGE WITH WIRE EXTENDING THERETHROUGH

BACKGROUND OF THE DISCLOSURE

1. Field of the Invention

This invention relates generally to a hinge and a wire extending through the hinge and further relates to eyeglasses, such as electrooptic eyeglasses, including a hinge through which one or more, preferably a set, of conductors extend to connect electrical components such as an electrical circuit and power supply to an eyeglass lens, thereby causing the lens to change an optical characteristic such as, for example, color, opaqueness, transmisivity or transmittance property.

2. Description of the Background Art

Eyeglasses typically include a frame in which a pair of eyeglass lenses are mounted, a pair of temples and a pair of hinges pivotally interconnecting the frame and the temples. Each hinge typically includes a tang extending outwardly from one end of the eyeglass frame, a clevis provided on one end of a temple and including a pair of spaced apart and generally parallel clevis members, and a pivot pin. The tang is provided with a pivot pin through hole and the clevis members are provided with a pair of axially aligned pivot pin through holes. The clevis members are placed around the tang, the through holes axially aligned and the connector pin is inserted into the aligned through holes to pivotally interconnect the tang and clevis. A "barrel type" eyeglass hinge is similar except it contains multiple tangs interleaved with clevises.

Eyeglasses are known to the art including electrooptical eyeglass lenses which are provided with or comprise an optical element which changes an optical characteristic, such as opaqueness, color, transmisivity, or transmittance property, upon an electrical signal or electric charge being applied to the eyeglass lens. For example, U.S. Pat. No. 4,756,605, entitled LIQUID CRYSTAL SPECTACLES, patented Jul. 12, 1988, Okada et al. inventors, discloses, a pair of spectacles including a pair of liquid crystal lens, a frame, a pair of temples and a pair of hinges pivotally interconnecting the temples and the frame of the spectacles. A regulator circuit is provided in each temple and a regulator circuit is connected to the eyeglass lens through a pair of conductors with the conductor extending through the brow of the spectacle frame and with the conductor 65 extending through the rim of the spectacle frame. The conductors are connected to transparent electrodes and when voltage from the regulator circuit is applied to the electrodes, the liquid crystal molecules of the liquid crystal layers gradually change their direction of orientation toward, become perpendicular to, the transparent plate. Thus, the refractive indices of liquid crystal layers, with respect to incident light, can be changed in succession.

Other eyeglasses are known to the art which include electrochromic eyeglass lenses wherein a transparent layer of electrochromic material is applied to the eyeglass lenses. Upon electrical charge being applied to such electrochromic lenses, the lenses change in transmittance property. See, for example, U.S. Pat. No. 5,520,851 entitled "IRIDIUM OXIDE FILM FOR ELECTROCHROMIC DEVICE", issued to Yu et al. on May 26, 1996, which is incorporated herein by reference.

The incorporation of such electronics into eyeglasses has produced a new need in the art. Unless all of the electronics, including the electrical signal generating circuit and the power supply, are placed between the hinge and the eyeglass frame, electrical connections between the electronics and the eyeglass lens must be made by traversing the hinge. Electrical connections traversing the hinge could provide only temporary electrical connection between the electronics and the lens which is lost when the frame is closed, or such electrical connections could be provided by sliding wiper contact which is lost momentarily as the wipers slide, or such electrical connections could be permanently connected wires extending between the electronics and the eyeglass lens. For reliability, permanent connection by wires, or electrical conductors, between the electronics and the lens is preferred. Further, since such permanent wired connections require the wired electrical conductors to traverse the hinge, it is preferable that the wires not experience a concentrated bending moment when the eyeglasses are alternately opened and closed because such repeated concentrated bending moments can result in breakage or shearing of the wires or electrical conductors.

Running the wires or electrical conductors past a hinge or pivot point between a temple and the eyeglass frame introduces several problems. If the wires, or conductors, run to the outside of the hinge or pivot point, the wires or conductors are stretched when the temples are closed on the eyeglass frame. If the wires or conductors are on the inside of the hinge or pivot point, the wires or conductors are stretched when the temples are opened away from the eyeglass frames. If the wires or conductors are on the outside of the hinge or pivot point and made long enough to not be under tension when the temples are closed on the eyeglass frame, the wires or conductors are then compressed and could be kinked when the eyeglass frame is opened and the temples pivoted away from the eyeglass frame.

Accordingly, there is a need in the art for a hinge having one or more wires, such as one or more electrical conductors, extending therethrough which overcomes the above-noted problems in the art particularly as experienced in eyeglass frames as set forth above.

SUMMARY OF THE INVENTION

The disadvantages associated with the prior art are overcome by the invention of a hinge and one or more wires, or electrical conductors, wherein a portion of such wire or wires are run axially through the center of a hollow pivot pin of a hinge to cause such wire or wire portions to be placed in torsion upon pivoting movement of the hinge. As such, the assembly eliminates any stretching of the wire(s) upon opening or closing of the eyeglass temples. Such a hinge and wire combination may be combined advantageously with the other components of an electrooptic eyewear device comprising at least one eyeglass lens which undergoes a change in an optical characteristic, such as transmittance, when an electrical signal, or electric charge, is applied to the eyeglass lens over such wires.

BRIEF DESCRIPTION OF THE DRAWINGS

The teachings of the present invention can be readily understood by considering the following detailed description in conjunction with the accompanying drawings, in which:

FIG. 1 is a perspective view of a pair of eyeglasses embodying the present invention;

FIG. 4 is a partial diagrammatical view of a wire or electrical conductor experiencing torsion; and FIG. 5 is a partial diagrammatical view of a wire or conductor experiencing bending about a pivot point.

DETAILED DESCRIPTION

Figure 2:
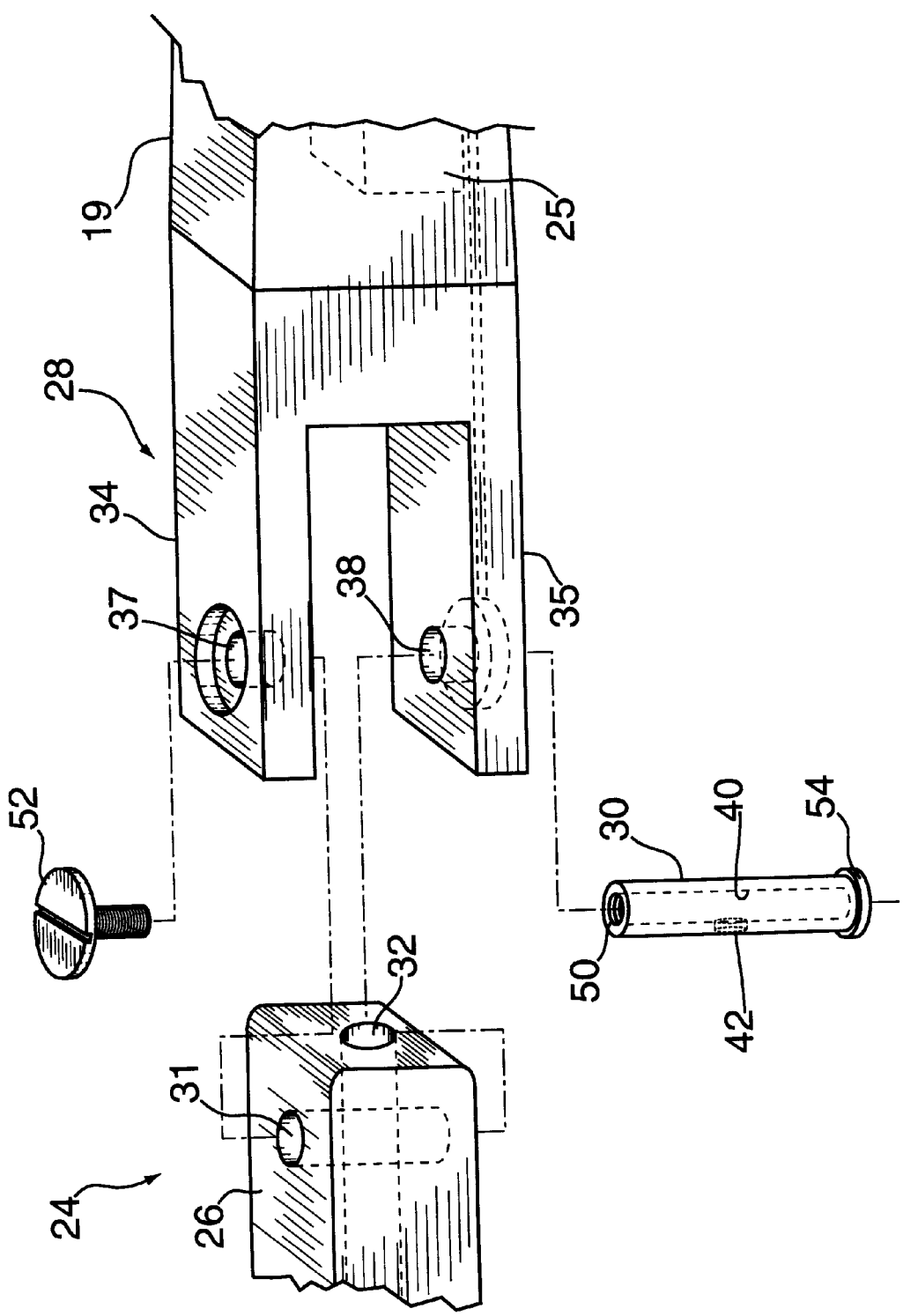
FIG. 2 is an exploded view of a hinge embodying the present invention and including a tang, clevis and pivot pin.

Referring now to FIG. 1, there are shown eyeglasses 10 embodying the present invention. Eyeglasses 10 include a frame 12 in which a pair of eyeglass lens 14 and 15 are mounted, a nose piece or bridge 16, temples 18 and 19 and hinges 22 and 24 which mount the temples 18 and 19 pivotally to the frame 12. The eyeglass lenses 14 and 15, in the preferred embodiment, are electrooptic lenses of the type known to the art which undergo a change in optical characteristic, for example, a change in their transmittance property, upon the application of a suitable electric charge to the electrooptic lens.

The temples 18 and 19 may have respective electronics, electrical circuits for generating electric charge and power supplies, 23 and 25 mounted suitably internally thereof for respectively applying electric charge to the electrochromic eyeglass lenses 14 and 15 over a pair of wires or electrical conductors not shown in FIG. 1. It will be understood that instead of having two sets of electronics 23 and 25, a single electrical circuit and power supply may be provided in only one of the temples for applying electric charge to only one eyeglass lens and the eyeglass lens 14 and 15 may be electrically interconnected by a suitable connector (not shown) extending across the bridge 16.

Figure 6:
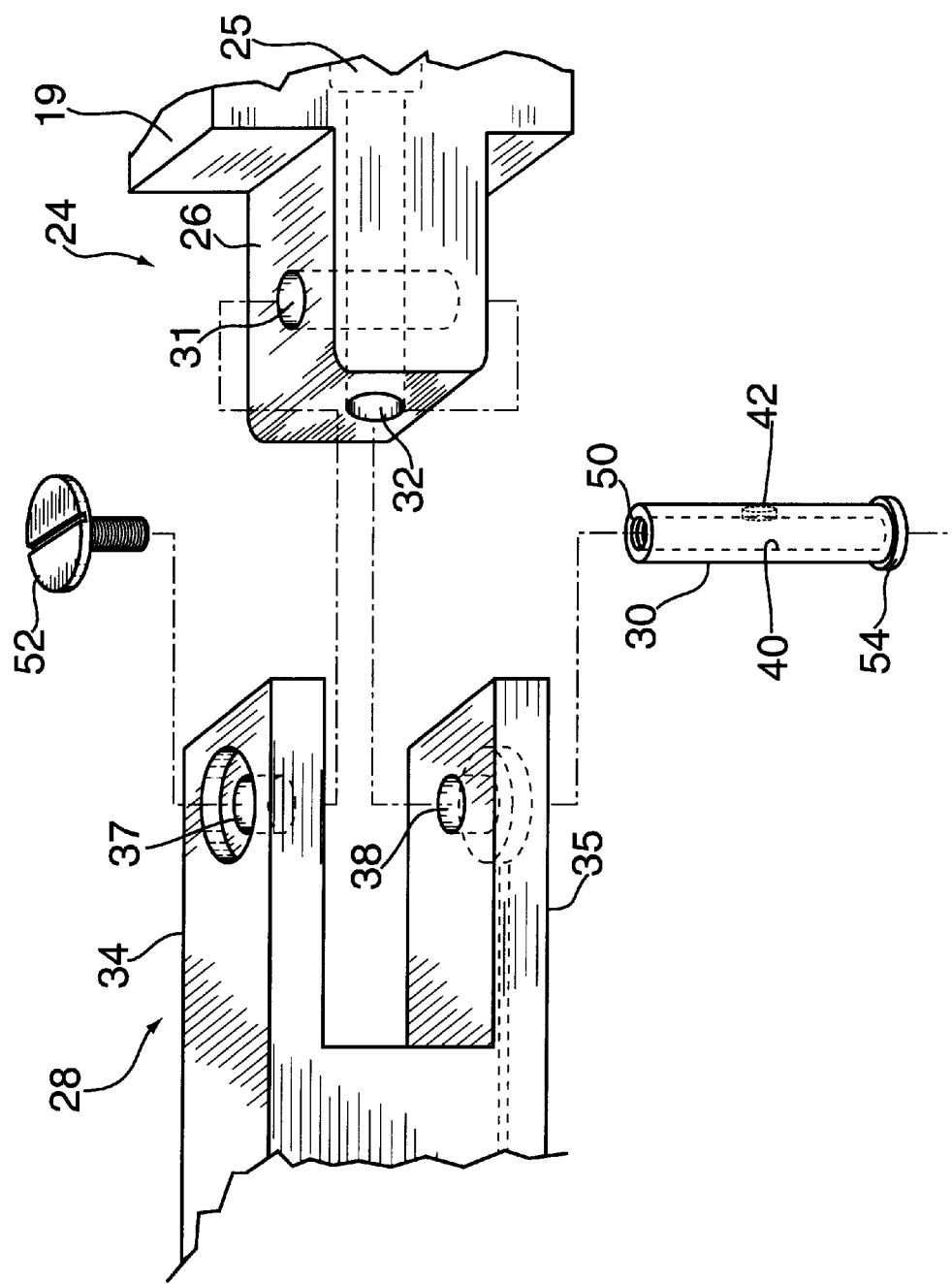
FIG. 6 is an exploded view of an alternative hinge embodiment of the present invention and including a tang, clevis and pivot pin.

Referring to FIG. 2, representative hinge 24, embodying the present invention, is shown in exploded view. Hinge 24 may include a tang 26, preferably a tang which is generally rectangular, extending outwardly from the eyeglass frame 12, a generally U-shaped clevis 28 extending outwardly from one end of the temple 19 and a cylindrical and longitudinally extending pivot or connector pin 30. Alternatively, as depicted in FIG. 6 the tang 26 can extend outwardly from a temple and the clevis 28 can extend outwardly from the frame. Furthermore, the tang 26 may have a rounded distal end to facilitate clearance for movement when the tang 26 is coupled to the clevis 28.

The tang 26 is provided with a connector pin 30 through hole or bore 31 for receiving the middle portion of the connector pin 30 and the tang 26 is, optionally, but preferably, further provided with a longitudinally extending hole or bore 32 extending longitudinally through the tang and perpendicular to and in communication with the pivot pin through hole 31.

The clevis 28 includes a pair of spaced apart and parallel clevis members or arms 34 and 35 provided, respectively, with axially aligned pivot or connector pin 30 through holes or bores 37 and 38 for receiving the opposed end portions of the pivot pin 30.

The pivot or connector pin 30 is provided with a centrally formed axial bore 40 extending longitudinally through the pivot pin and, optionally, but preferably a transverse or radial bore 42 extending inwardly from about the midportion of the pivot pin and being perpendicular to and in communication with the axial bore 40. The, for example, upper portion 50 of the hole 40 of the pivot pin 30 can be threaded to receive screw 52. Additionally, pin 30 has, on its lower portion a radially extending flange 54. Hole 37 in clevis arm 34 is counterbored to accept the head of screw 52 and hole 38 in clevis arm 35 is counterbored to accept the flange 54. When assembled, the flange will rest against the counterbore surface of hole 38 and the screw head will rest against the counterbore surface of hole 37. As such, when the screw is tightened into the bore 31, the pin 30 is retained in the clevis 28.

It will be understood that the tang longitudinal bore 32, in the preferred embodiment, provides a passageway for receiving a portion of one or more, preferably a set or pair of wires, or electrical conductors, for interconnecting the electronics 25 provided in the temple 19 with the electrochromic lens 15 mounted in the eyeglass frame 12. It is noteworthy that the wire(s) can connect any type of electrical components across the hinge and that direct connection to a lens is not necessary. And, in the preferred embodiment, the axial bore 40 and radial bore 42 formed in the pivot pin 30 combine to provide a passageway for receiving a portion of such wires or electrical conductors.

Referring still to FIG. 2, for assembly, the clevis members or arms 34 and 35 are placed over the tang 26 and the pivot or connector pin 30 through hole 31 formed in the tang and the pivot pin through holes 37 and 38 formed respectively in the clevis members 34 and 35 are axially aligned and the pivot pin 30 is inserted through the aligned through holes to hingedly or pivotally interconnect the tang 26 and clevis 28. Preferably, once the pin 30 is inserted such that the flange 54 rests against the counterbore surface of bore 38, the screw 52 is tightened to eliminate play in the hinge. A locking pin (not shown) can be inserted through the end of tang 26 through bore 32 into pivot pin 30 opposite bore 42 preventing relative motion between tang 26 and pivot pin 30. Alternatively, it will be understood that the pivot pin 30, tang pivot pin through hole 31 and clevis pivot pin through holes 37 and 38 are dimensioned such that the center portion of the pivot pin is alternatively press-fit, or otherwise fixed, into the tang through hole 30 to mount the pivot pin 30 and tang 26 stationarily with respect to each other. Additionally, the opposed outer end portions of the pivot pin 30 are alternatively slip-fit into the clevis pivot pin through holes 37 and 38 to permit relative movement between the clevis 28 and the outer end portions of the pivot pin 30 such that pivotal movement is provided between the tang 26 and clevis 28 by the clevis 28 pivoting about the opposed end portions of the pivot pin 30.

Figure 3:
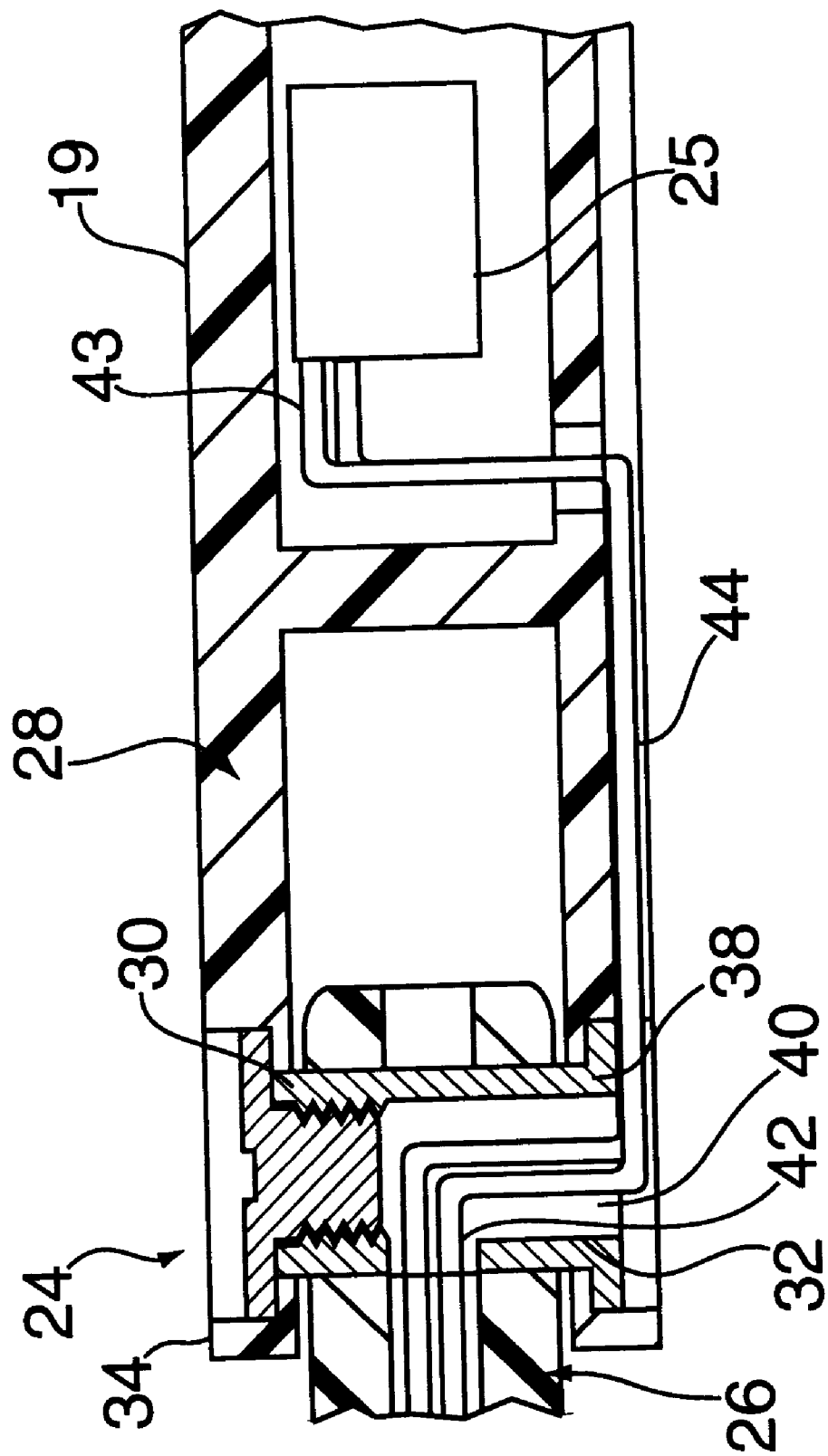
FIG 3 is an assembled view of the tang, clevis and connector pin and pivot pin shown in FIG. 3 and further showing a pair of wires or electrical connectors extending through the hinge.

Referring now to FIG. 3, the representative hinge 24 is shown assembled as described above with regard to FIG. 2. It will be noted in FIG. 3 that in the assembled condition, the radial bore 42 formed in the connector pin 30 is opposed and in communication with the longitudinal bore 32 formed in the tang 26. The eyeglasses 10 may further include one or a plurality, preferably a pair of wires, or electrical connectors 43 and 44, connecting the electronics, electrical circuit and power supply, 25 to the electrochromic eyeglass lens 15. The electronics 25 supplies a suitable electric charge over the wires 43 and 44 to the electrochromic eyeglass lens 15 to cause the eyeglass lens to undergo a change in transmittance property as noted above. In the preferred embodiment, the wires or electrical conductors 43 and 44 are made of spring temper wire, or alternatively, the electrical conductors may include a metal core surrounded by a layer of insulation. As shown in FIG. 3, the wires or electrical conductors 43 and 44 extend along the outside of the clevis 28, are bent inwardly and are extended into the axial bore 40 provided in the pivot pin 30 and are bent and extend outwardly and through the radial bore 42 formed in the pivot pin 30 and into and through the longitudinal bore 32 formed in the tang 26 for suitable connection, directly or indirectly, to the electrochromic eyeglass lens 15. It will be recalled that in assembly, the connector pin 30 is mounted stationarily with respect to the tang 26 and that the clevis 28 swings or pivots about the opposed end portions of the connector pin 30. Accordingly, it will be understood, that the portions of the wires or electrical conductors 43 and 44 residing in the axial bore 40 of the connector pin 30 are placed in torsion as indicated diagrammatically in FIG. 4 by the oppositely directed circular arrows, and not subjected to bending as indicated diagrammatically in FIG. 5 about a pivot point, during pivoting movement between the tang 26 and clevis 28 provided by the clevis 28 swinging or pivoting about the opposed end portions of the pivot pin 30.

Referring again to FIG. 3, eyeglasses 10 may further include a suitable cover, not shown, residing over the wires or electrical conductors 43 and 44 and the outer end portion of the temple 19 extending toward the eyeglass frame 12.

In brief review, it has been discovered that by running a portion of a wire through the center of a hollow pivot pin of a hinge, the hinge is not weakened and such wire portion if placed in torsion upon pivotal hinge movement which torsion is distributed along the length of such wire portion and such wire portion experiences relatively moderate strain and such strain is not concentrated at a pivot point as would be the case for such wire portion were the wire portion to experience bending during pivoting of the hinge. Additionally, the inventive arrangement permits the wire(s) to be hidden from view at all times.

Lastly, it will be understood that the present hinge and wire invention may be embodied in apparatus or devices other than eyeglasses and the present hinge and wire invention is not limited to eyeglasses. Furthermore, the foregoing embodiment of the invention contains a single tang that couples to a clevis having two arms. Those skilled in the art will realize from the foregoing disclosure that the hinge can alternatively contain multiple tangs and multiple clevis arms, i.e., the hinge could be a barrel-type hinge.

Although various embodiments which incorporate the teachings of the present invention have been shown and described in detail herein, those skilled in the art can readily devise many other varied embodiments that still incorporate these teachings.

What is claimed is:

1. Eyeglass apparatus, comprising:
   an eyeglass frame, a pair of temples and a pair of hinges respectively pivotally interconnecting said eyeglass frame with said temples, a pair of eyeglass lenses mounted in said eyeglass frame and each of said eyeglass lenses comprising optical means for changing an optical characteristic of said eyeglass lenses upon receipt of an electrical signal, an electrical circuit for providing an electrical signal to at least one of said eyeglass lenses and said electrical circuit mounted to at least one of said temples, at least one of said hinges including a tang extending outwardly from said eyeglass frame and a clevis extending outwardly from one end of one of said temples and a pivot pin pivotally interconnecting said tang and said clevis, at least one electrical conductor interconnecting said electrical circuit with at least one of said eyeglass lenses and a first portion of said electrical conductors extending through a first conductor passageway formed in said pivot pin.

2. The eyeglass apparatus of claim 1 wherein a second portion of said electrical conductor extends through a second conductor passageway formed in said tang.

3. The eyeglass apparatus according to claim 2 wherein said pivot pin comprises a generally cylindrical and longitudinally extending first body and wherein said second conductor passageway comprises a first axial bore extending longitudinally through at least a first portion of said pivot pin and a second radial bore extending generally transversely through a second portion of said pivot pin and in communication with and generally perpendicular to said axial bore.

4. The apparatus according to claim 3 wherein said tang includes a second body having a first pivot pin through hole extending therethrough for receiving the mid-portion of said pivot pin and wherein said second conductor passageway comprises a longitudinal bore extending generally longitudinally through said second body and generally perpendicular to and in communication with said first pivot pin through hole.

5. The eyeglass apparatus according to claim 4 wherein said clevis includes a generally U-shaped third body including a pair of spaced apart substantially parallel and generally rectangular clevis members having, respectively, second and third axially aligned pivot pin through holes extending therethrough for receiving the outer end portions of said pivot pin, upon said clevis members being placed over said tang and upon said pivot pin through holes being axially aligned said pivot pin being inserted through said pivot pin through holes to pivotally interconnect said tang and said clevis.

6. The eyeglass apparatus according to claim 1 wherein said eyeglass apparatus further comprises a second electrical circuit for providing an electrical signal to the other of said eyeglass lenses and said second electrical circuit mounted to the other one of said temples, a second hinge including a second tang extending outwardly from said eyeglass frame and a second clevis extending outwardly from one end of the other one of said temples and a second pivot pin pivotally interconnecting said second tang and said second clevis, a second electrical conductor interconnecting said second electrical circuit with the other of said eyeglass lenses and a third portion of said second electrical conductor extending through a third conductor passageway formed in said second pivot pin and a fourth portion of said second electrical conductor extending through a fourth conductor passageway formed in said second tang and said third portion of said second electrical conductor being placed in torsion upon pivotal movement between said second tang and said second clevis about said second pivot pin.

7. The apparatus of claim 1 further comprising a plurality of tangs and a plurality of clevises being pivotally interconnected by a pivot pin.

8. The apparatus of claim 1 wherein the tang has a rounded distal end.

9. The apparatus of claim 1 wherein the pivot pin further comprises a first end and a second end, where said first end contains a radially extending flange and said second end contains a longitudinally directed threaded bore.

10. Eyeglass apparatus, comprising:
    an eyeglass frame, a pair of temples and a pair of hinges respectively pivotally interconnecting said eyeglass frame with said temples, a pair of eyeglass lenses mounted in said eyeglass frame and each of said eyeglass lenses comprising optical means for changing an optical characteristic of said eyeglass lenses upon receipt of an electrical signal, an electrical circuit for providing an electrical signal to at least one of said eyeglass lenses and said electrical circuit mounted to at least one of said temples, at least one of said hinges including a tang extending outwardly from one end of one of said temples and a clevis extending outwardly from said eyeglass frame and a pivot pin pivotally interconnecting said tang and said clevis, at least one electrical conductor interconnecting said electrical circuit with at least one of said eyeglass lenses and a first portion of said electrical conductors extending through a first conductor passageway formed in said pivot pin.

11. The eyeglass apparatus of claim 10 wherein a second portion of said electrical conductor extends through a second conductor passageway formed in said tang.

12. The eyeglass apparatus according to claim 11 wherein said pivot pin comprises a generally cylindrical and longitudinally extending first body and wherein said second conductor passageway comprises a first axial bore extending generally centrally and longitudinally through at least a first portion of said pivot pin and a second radial bore extending generally transversely through a second portion of said pivot pin and in communication with and generally perpendicular to said axial bore.

13. The apparatus according to claim 10 wherein said tang includes a second body having a first pivot pin through hole extending therethrough for receiving the mid-portion of said pivot pin and wherein said second conductor passageway comprises a longitudinal bore extending generally longitudinally through said second body and generally perpendicular to and in communication with said first pivot pin through hole.

14. The eyeglass apparatus according to claim 10 wherein said clevis includes a generally U-shaped third body including a pair of spaced apart substantially parallel and generally rectangular clevis members having, respectively, second and third axially aligned pivot pin through holes extending therethrough for receiving the outer end portions of said pivot pin, upon said clevis members being placed over said tang and upon said pivot pin through holes being axially aligned said pivot pin being inserted through said pivot pin through holes to pivotally interconnect said tang and said clevis.

15. The eyeglass apparatus according to claim 14 wherein said eyeglass apparatus further comprises a second electrical circuit for providing an electrical signal to the other of said eyeglass lenses and said second electrical circuit mounted to the other one of said temples, a second hinge including a second tang extending outwardly from one end of the other one of said temples and a second clevis extending outwardly from said eyeglass frame and a second pivot pin pivotally interconnecting said second tang and said second clevis, a second electrical conductor interconnecting said second electrical circuit with the other of said eyeglass lenses and a third portion of said second electrical conductor extending through a third conductor passageway formed in said second pivot pin and a fourth portion of said second electrical conductor extending through a fourth conductor passageway formed in said second tang and said third portion of said second electrical conductor being placed in torsion upon pivotal movement between said second tang and said second clevis about said second pivot pin.

16. The eyeglass apparatus of claim 10 further comprising a plurality of tangs and a plurality of devises being pivotally interconnected by a pivot pin.

17. The eyeglass apparatus of claim 10 wherein the tang has a rounded distal end.

18. The eyeglass apparatus of claim 10 wherein the pivot pin further comprises a first end and a second end, where said first end contains a radially extending flange and said second end contains a longitudinally directed threaded bore.

* * * * *